(12) United States Patent
Hibbard

(10) Patent No.: US 11,136,007 B2
(45) Date of Patent: Oct. 5, 2021

(54) TIRE INFLATING DEVICE

(71) Applicant: Kevin Allen Hibbard, Owosso, MI (US)

(72) Inventor: Kevin Allen Hibbard, Owosso, MI (US)

( * ) Notice: Subject to any disclaimer, the term of this patent is extended or adjusted under 35 U.S.C. 154(b) by 244 days.

(21) Appl. No.: 16/392,666

(22) Filed: Apr. 24, 2019

(65) Prior Publication Data

US 2019/0322247 A1 Oct. 24, 2019

Related U.S. Application Data

(60) Provisional application No. 62/661,790, filed on Apr. 24, 2018.

(51) Int. Cl.
*B60S 5/04* (2006.01)
*G05D 16/20* (2006.01)

(52) U.S. Cl.
CPC ............ *B60S 5/046* (2013.01); *G05D 16/208* (2013.01)

(58) Field of Classification Search
CPC . B60S 5/046; B60S 5/043; B60S 5/04; G05D 16/208; B29C 73/166; B67C 3/2628; B67C 3/06; B67C 3/2625; B67D 1/10; B67D 7/58; B67D 7/72
USPC ................ 141/38, 39, 40, 41, 285, 301, 302
See application file for complete search history.

(56) References Cited

U.S. PATENT DOCUMENTS

| | | | | | |
|---|---|---|---|---|---|
| 3,335,766 | A | * | 8/1967 | Winger | B60S 5/043 141/38 |
| 3,626,970 | A | * | 12/1971 | Jones | F04D 13/16 137/209 |
| 3,943,329 | A | * | 3/1976 | Hlavac | A45D 20/122 392/379 |
| 4,875,509 | A | * | 10/1989 | Da Silva | B60S 5/046 141/38 |
| 5,051,068 | A | * | 9/1991 | Wong | F04B 35/04 417/234 |
| 5,070,917 | A | * | 12/1991 | Ferris | B60S 5/04 141/38 |
| 5,307,846 | A | * | 5/1994 | Heinemann | B60S 5/043 137/223 |
| 5,313,995 | A | | 5/1994 | Schultz | |
| D361,950 | S | * | 9/1995 | Mascio | D10/86 |
| 5,540,268 | A | | 7/1996 | Mittal | |

(Continued)

*Primary Examiner* — Justin M Jonaitis

(57) ABSTRACT

The present invention is an apparatus for tire inflation designed to allow users to properly inflate, maintain, and monitor the condition of vehicle tires. The tire inflation device of present invention is comprising of: a carrying case having a housing, a lid attached to the housing using a hinge, a plurality of locking latches to lock the lid over the housing and a handle configured over the lid to allow easy transport of the tire inflating device. The tire inflation device further comprises, a control head assembly to control the working of the device, an air compressor coupled with the control head assembly to provide compressed air for inflation of tires, a hose assembly to connect the device with the vehicle tires and a plurality of power adapters to connect the device with the power source. The control head assembly of the inflation device is further comprising of, a program control module, an auto level manifold, a plurality of output modules, an air release valve, a pressure release valve, a plurality of buttons and switches, and a display unit.

11 Claims, 9 Drawing Sheets

(56) References Cited

U.S. PATENT DOCUMENTS

| | | | |
|---|---|---|---|
| 5,611,875 A | 3/1997 | Bachhuber | |
| 6,705,360 B1* | 3/2004 | Bonzer | B60S 5/046 141/192 |
| 7,137,417 B2* | 11/2006 | Kroll | B60S 5/046 141/66 |
| 2006/0272732 A1* | 12/2006 | Lighter | B60S 5/046 141/38 |
| 2009/0193937 A1* | 8/2009 | Steele | B29C 73/166 81/15.2 |
| 2010/0101375 A1* | 4/2010 | Yoshida | B60S 5/043 81/15.6 |
| 2013/0087224 A1* | 4/2013 | Galasso | F17C 9/00 137/557 |

\* cited by examiner

FIG. B

TIRE INFLATING DEVICE

CROSS REFERENCE TO RELATED APPLICATION

This application claims priority from U.S. Patent Application No. 62/661,790 filed on Apr. 24, 2018, which is incorporated by reference herein in its entirety.

FIELD OF THE INVENTION

The present invention generally relates to tire inflating tools. More specifically, the present invention is an apparatus designed to inflate, regulate, and maintain the air pressure in tires of various sizes.

BACKGROUND OF THE INVENTION

Storing vehicles for extended periods of time without driving is not uncommon. Cars can become a valuable investment over time if kept in original condition, especially models that are unique, and with limited production numbers. As various models become more and more desirable and the overall supply decreases, the demand for such vehicles increases, ultimately driving the price up. Enthusiasts prefer a vehicle that has been kept in the best possible position. Furthermore, to make sure the vehicle is operable, both the electrical and mechanical systems must be maintained even if the vehicle is unused for prolonged periods of time. According to the National Highway Traffic System Administration (NHTSA), under or over inflated tires have an increased risk of failure. Not only will they wear out prematurely but if under inflated, the increased rate of deterioration can lead to reduced traction and tire blowouts which may end in catastrophic accidents. In addition to the safety aspect of these tires there is an environmental and economic benefit to maintain tires at correct pressures. As a general rule gas mileage may be reduced by 0.2% by every 1 PSI (pound per square inch) the tire pressure drops below the recommended manufacturer level. Based on this analysis, by keeping the tires inflated at the correct pressure one could save up to 3% in fuel, depending on the specific vehicle and driving habits.

A tire may deflate due to various reason, including punctures or improper installation. Temperature variation is another reason as to why a tire may lose pressure over time. Most conventional tires are filled with pressurized air, which is susceptible to temperature variations. In climates where temperature fluctuations are frequent, it is not uncommon for tire pressures to vary to various degrees. If a car is stored for extended periods of times the tires will eventually loose their ability to hold air pressure. Flat spotting occurs when a vehicle is parked for extended periods of time. At first the user experiences a bumpier ride than usual, and after a few miles the problem may or may not disappear. Tires are manufactured out of rubber elastic materials with integrated nylon or wire structural elements, as such any variations in temperature and air pressures directly correlate to the overall performance of the tire.

Even if a vehicle is equipped with matching tires all around, not all wheels will deflate at the same exact rate. Uneven inflation can lead to irregular driving conditions which may further impact the ride quality of the vehicle, prematurely wear suspension component, thus leading to an overall unpleasant driving experience. Mismatched tire pressure is commonly the cause for what is known in the industry as heel/toe wear and alternate lug wear on drive tires, along with numerous flat spot wear and erratic depression wear on trailer tires. Improper tire wear may not seem as an immediate problem that has to be addressed, however factored over time and at a larger scale application such as fleet vehicles it can cause significant financial loss to companies in tire longevity and fuel economy.

Automobiles equipped with four-wheel drive systems must have matching tires inflated at equivalent pressures, otherwise the vehicle may experience significant drivability problems. Examples include shudder on acceleration, driveline and transfer case noise as well as axle problems. Some modern systems allow the user to change the vehicle dynamics into four-wheel traction while driving, and irregular tires may hinder the system from correct operation. The present invention aims to solve this problem by disclosing an apparatus designed to maintain a pre-set tire pressure at all tires of the vehicle. In addition, the present invention is self-regulating, and includes a plurality of features for the user.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The present invention is an apparatus designed to allow users to properly inflate, maintain, and monitor the condition of vehicle tires. The present invention comprises a control unit with programmable on-board control module with a variety of functions and features, including but not limited to auto-level mode, inflate mode, maintainer mode and auto OFF, and auto ON. The control module may or may not be controlled manually or accessed remotely with an app via a phone or other device over Wi-Fi, Bluetooth or other wireless data communication means. In addition, due to the prolonged hours of operation which the present invention may experience, the apparatus includes various integrated safety features, including electrical breakers, safety arrests, thermal protection, and pressure release valves. Furthermore, the present invention is versatile, can be portable and may be adapted for use on tires of various sizes. The present invention may provide other features including a battery saver functionality, a safety fighting and mobile device charging. In addition, a permanently mounted solution may also be adapted depending on the preference of the user.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAIL DESCRIPTIONS OF THE INVENTION

The embodiment herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the method and embodiments herein may be practiced and to further enable those of skill in the art to practice the embodiments herein. Accordingly, the examples should not be construed as limiting the scope of the embodiments herein.

Figure 1:
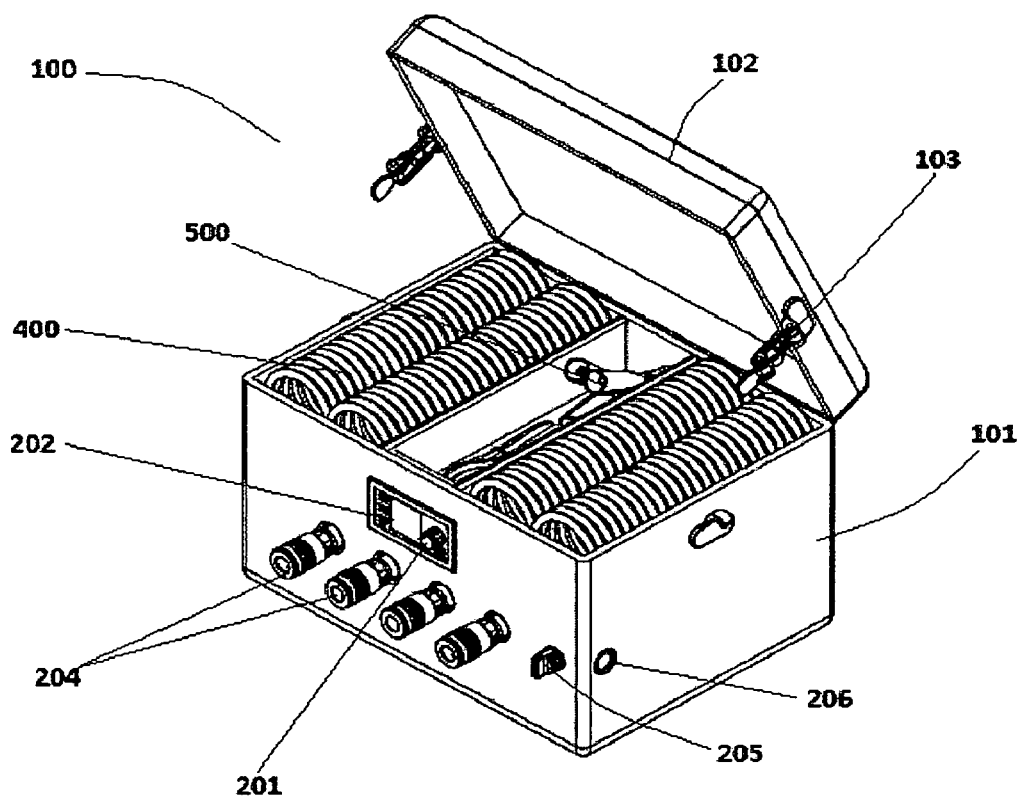
FIG. 1 is a perspective view of the tire inflating device according to one aspect of present invention.
Figure 2:
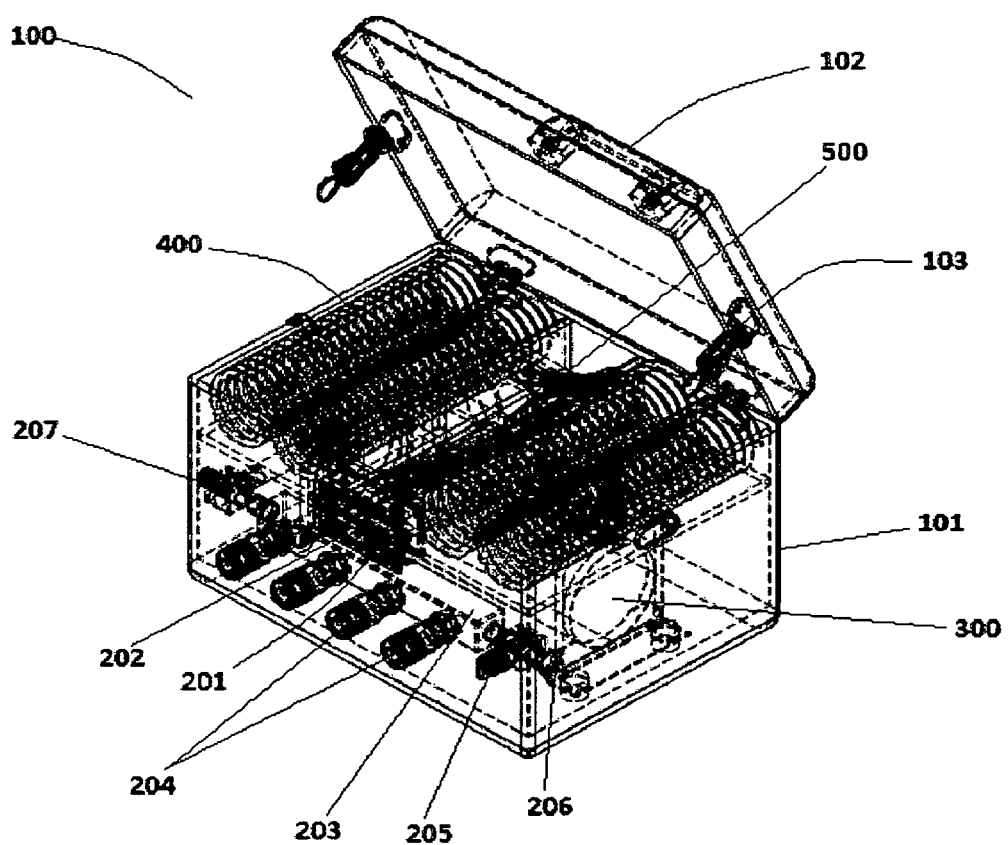
FIG. 2 is an exploded perspective view of the tire inflating device according to one aspect of the present invention.
Figure 3:
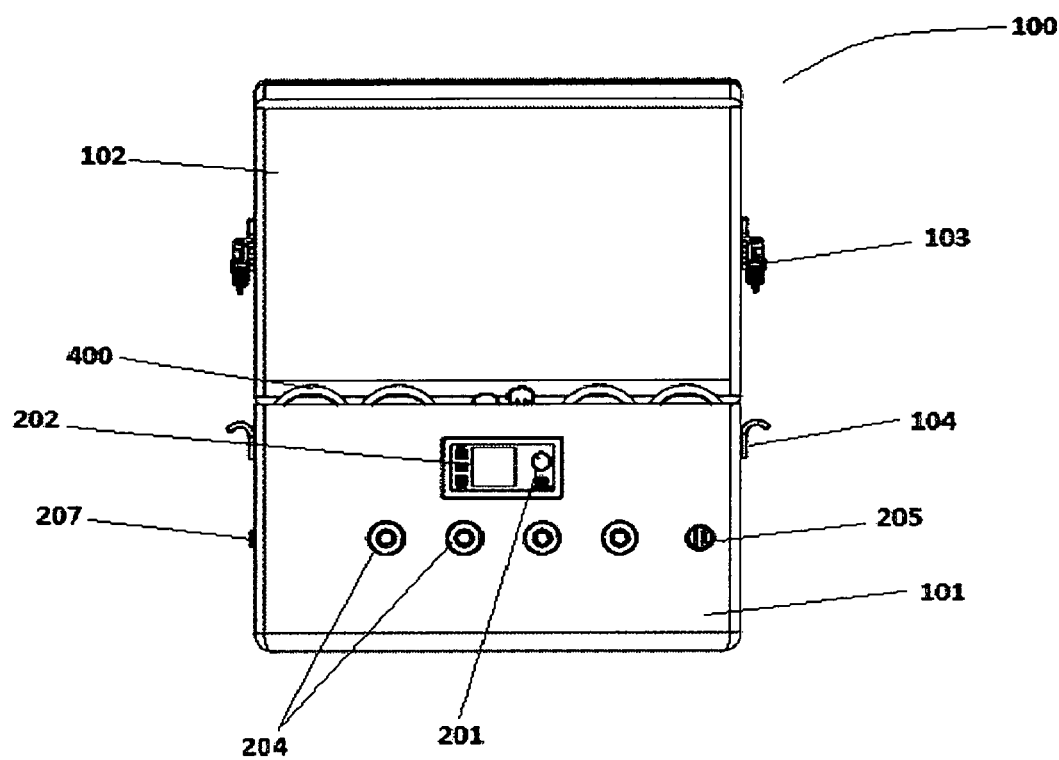
FIG. 3 is a front view of the tire inflating device according to one aspect of the present invention.
Figure 4:
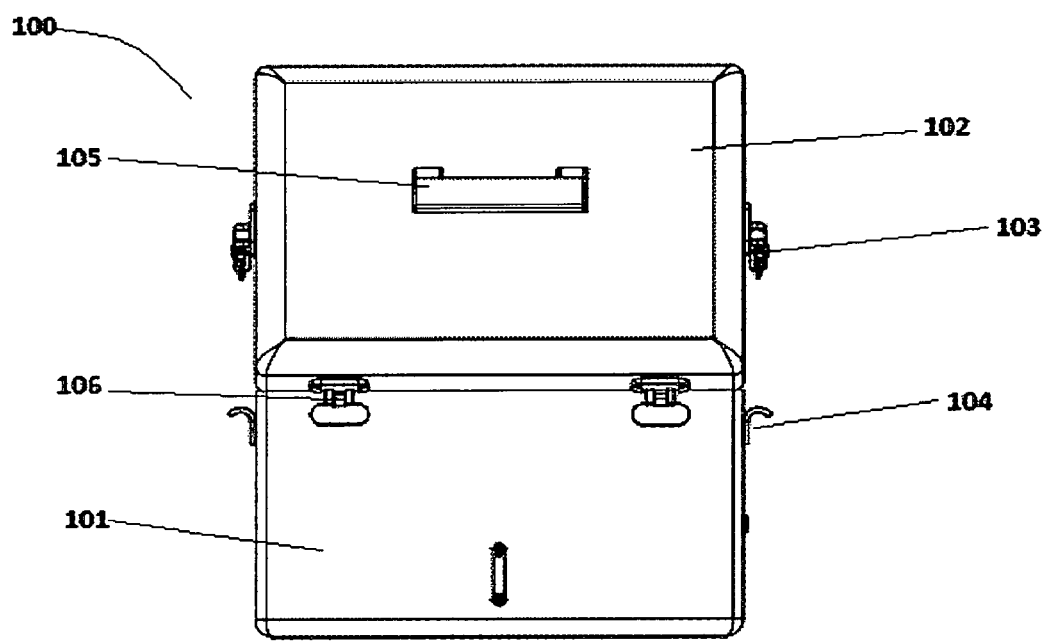
FIG. 4 is a back view of the tire inflating device according to one aspect of the present invention.

In reference to FIG. 1 and FIG. 2 which exemplarily illustrates the perspective view and the exploded perspective view respectively of tire inflating device of present invention that comprises a carrying case 100, an air compressor 300 and a control head assembly 200, a hose assembly 400, and a plurality of power adapters 500. The carrying case 100 further comprises a housing 101, a lid 102 attached to the housing 101 using a hinge (not shown), and a plurality of locking latches (103&104). The carrying case 100 can resemble a rectangular prism in shape, however the present invention is not limited to this option, and other designs may be implemented depending on user preference. The housing 100 further comprises a plurality of storage compartments, specifically designed to allow users to keep the plurality of hoses 300 and accessories needed for operation in an organized and contained fashion. The lid 102 is positioned on top of the housing 101 as seen in FIG. 3, protecting the components of the invention from the elements. Addition, a handle 105 is positioned centrally on the lid 102 as seen in FIG. 4. The handle allows the user to easily transport the device.

The carrying case 100 may be water resistant to prevent potential damage to the internal components of the device, as such the present invention further comprises a seal (not shown). The seal is positioned between the housing the lid ensuring the components of the present invention are protected from the elements, and the opening is watertight when the lid 102 is closed. The lid 102 is connected to the housing 101 via the plurality of hinges 106, as seen in FIG. 4.

Figure 5:
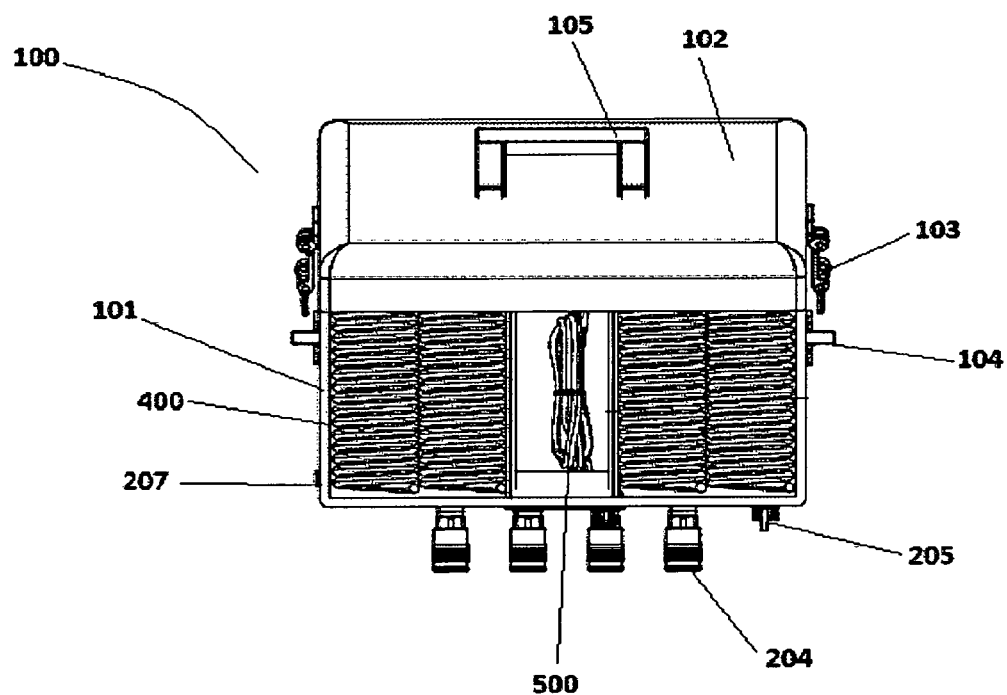
FIG. 5 is a top view of the tire inflating device according to one aspect of the present invention.

The plurality of hinges 106 are positioned onto the back edge between the lid 1012 and the housing 101, allowing the user to pivot the lid 102 while opening and closing the device. The lid 102 further comprises a plurality of latches 103 as seen in FIG. 1. The plurality of latches 103 is positioned on the first lid width panel, and the second width lid panel respectively. The plurality of latches allows the user to lock the lid 102 to the housing 101. Referring to FIG. 5 which discloses top view of the inflation device showing plurality of storage compartments within the housing 101 of the device 100 to safely store plurality of air hoses 400 as well as other accessories such as plurality of power adapters that allows connection of the device 100 with power source.

Figure 6:
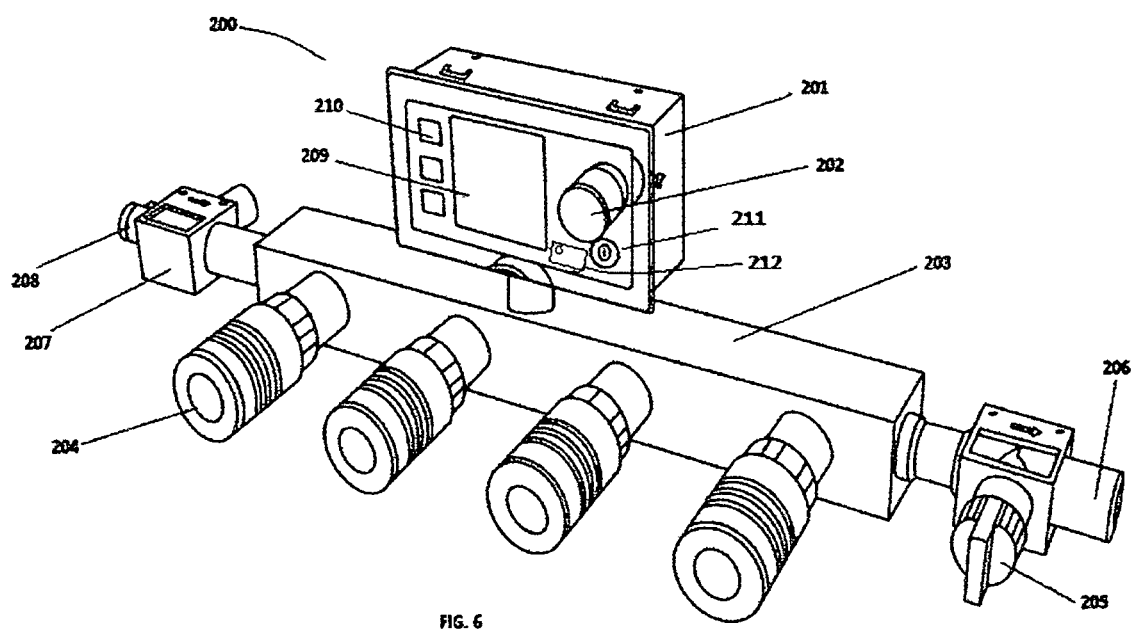
FIG. 6 exemplarily illustrates a control head assembly of the tire inflating device according to one embodiment of the invention.

In the present embodiment the air compressor 300 may further comprises a motor, a pressure switch 212 (FIG. 6), an air pump, and a thermal switch 211 (FIG. 6). Various types of air compressors 300 may be used and as such the present invention is not limited to one particular option. In the preferred embodiment the air compressor 300 is positioned at the bottom of the housing 100 as seen in FIG. 2. By storing the air compressor 300 into the housing 100, or by mounting it, the invention may maintain an overall compact and portable design. The thermal switch 211 (seen in FIG. 6) prevents the present invention from potential overheating. The control head assembly 200 is connected directly to the air compressor 300 as seen in FIGS. 7-8.

In reference to FIG. 2, and FIGS. 6-8, the control head assembly 200 further comprises: a program module 201 having pressure adjustment switch 202 configured to allow user to select any of the working mode from different working modes of the device 100 and also to adjust desired PSI level for tires, an auto level manifold 203, a plurality of outputs 204, an air release valve 205 with outlet 206 configured to evenly decrease the tire air pressure by releasing undesired air pressure, and a pressure release valve 207 with outlet 208. The program module 201 may further comprise a user interface (not shown), a plurality of buttons 210 to select the modes, adjust the PSI, manipulate the operation of device etc., a display 209 for displaying the real time operation mode and PSI setting, and an electrical breaker (not shown) to protect damage caused by overcurrent resulting from an overload or short circuit. The control head assembly 200 allows the user to program the present invention in a variety of different ways. Control and/or notifications from phone or other device through an app may be incorporated via Wi-Fi, Bluetooth or other wireless data communication means. Furthermore, the control head assembly 200 comprises a plurality of different functions and modes including but not limited to, auto level mode, inflate mode, maintainer mode with auto off, auto on, and periodic pound per square inch (PSI) check at different time intervals. The auto level mode may be used as a stand-alone function. After the user has connected the plurality of air hoses 400 to the plurality of tires the auto level function will be initiated and will automatically level all the tires to the same reading. Depending on the condition of the tires and the existing pressure the tires may be brought to the same equivalent PSI without additional assistance from the air compressor 300. This process is completed through the auto level manifold 203, which connects all of the tires together in parallel. The inflator mode, allows users to easily fill all of the tires of the vehicle at the same time. After the plurality of connecting hoses 400 is attached to the tires, the user sets the present invention to the desired PSI. Once the tires reaches the pre-set setting the inflator will turn off. Furthermore, the user is able to customize the pressure value in each of the tires or in any combination, including front to rear, left to right or all at the same time depending on their preference, and manufacturer recommendation.

The Maintainer Mode is ideal for when storing a vehicle for any length of time. In this mode there are two settings, Auto OFF PSI and Auto ON PSI. The Auto Off PSI setting allows user to set desired PSI he/she want the tires of vehicle to maintain while sitting and this mode automatically turns the air compressor 300 off, once the tires reaches the desired PSI. The Auto ON PSI setting is the PSI the user sets when he/she wants the compressor to turn back on and fill up to the preset Auto OFF PSI level or in this mode, the device turns compressor 300 on when tires have been deflated to user preset PSI level and turns off once the PSI level reaches to the preset Auto off PSI setting. Further, the Auto On PSI mode has three user modes to choose from which are: PSI, Timed PSI Check, and Hold PSI or continuous mode. In the PSI mode, the user determines what PSI the tires can reach before turning on the compressor 300. In Times PSI check mode, user can set time intervals for when the control module 200 monitors the PSI and if the control module 200 finds tire deflation during a Timed PSI check, the compressor 300 gets turned on and inflates the tires to the Auto Off PSI setting and then gets turn off until the next Timed PSI check. In the continuous mode, the air compressor 300 turns on as soon as there is decrease of 1 psi from the preset Auto Off PSI setting.

Figure 7:
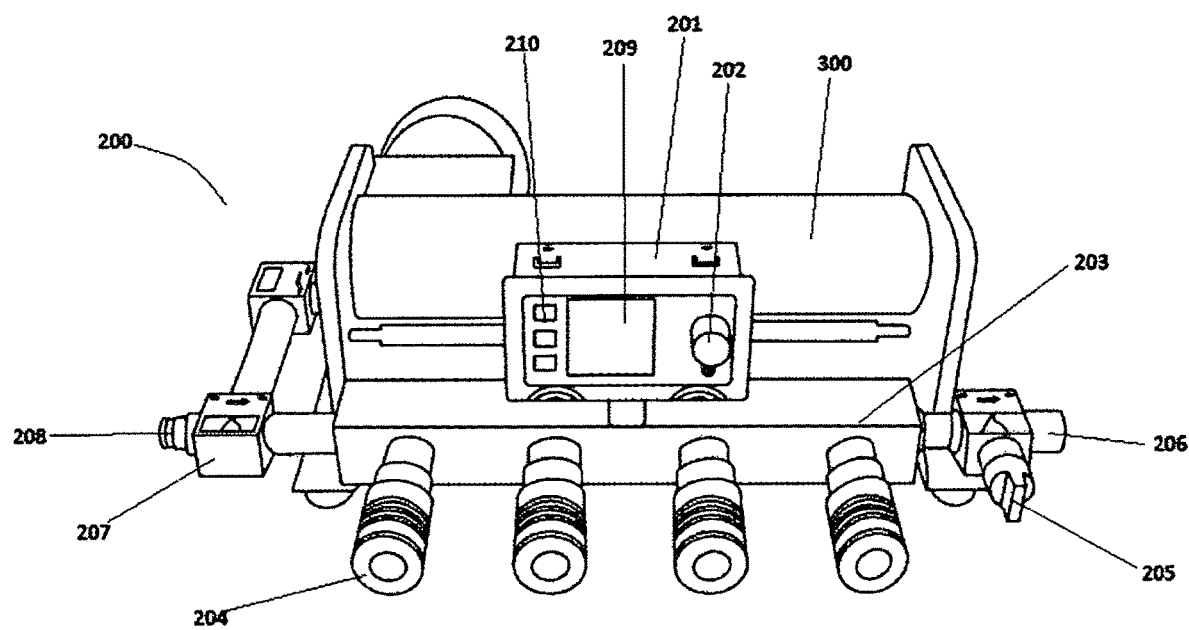
FIG. 7 exemplarily illustrates an embodiment of control head assembly connected to the air compressor of the tire inflating device of present invention.
Figure 8:
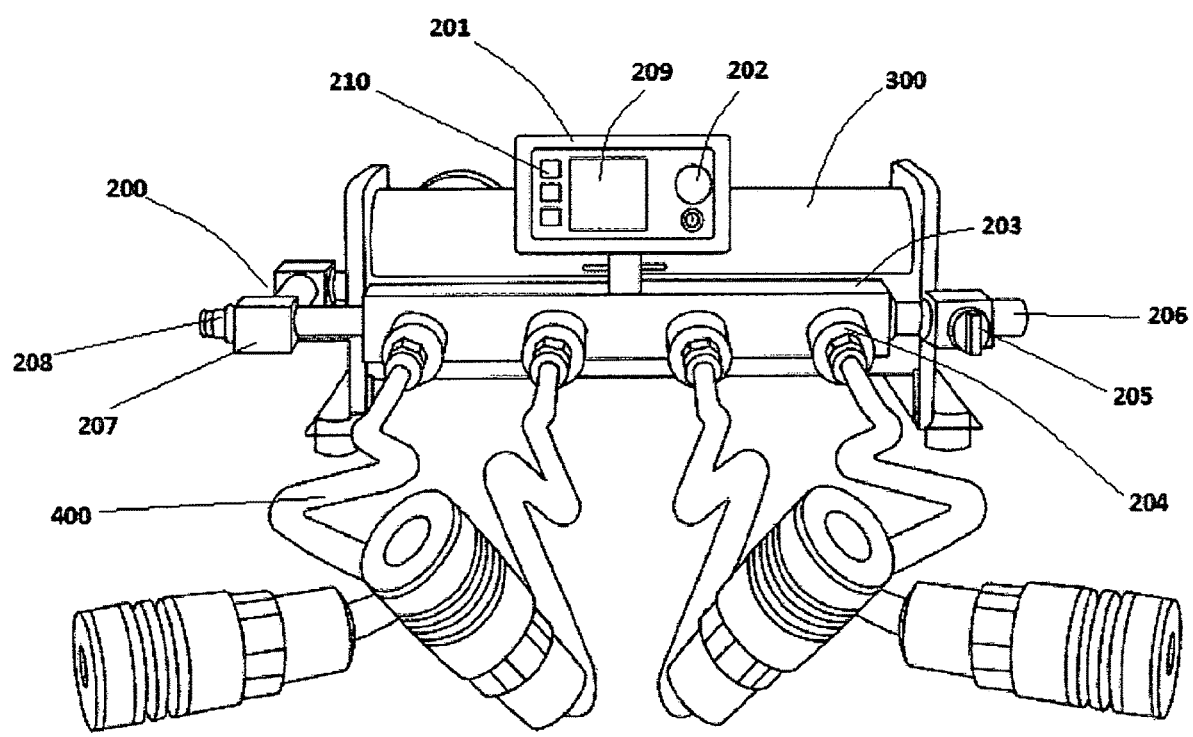
FIG. 8 is another illustration of the present invention, showing the stand-alone hardware of the tire inflating device without the casing.

The pressure release valve 207 as shown in FIG. 6-8 is designed to prevent the tires from being overinflated. Various types of pressure release valves may be used in the present invention including both electrically controlled or mechanically controlled valves. Electric pressure release valves are generally controlled via a plurality of solenoids that remotely shut off pressure when a certain point has been reached. In an alternative embodiment a manual mechanical controlled pressure valve may be used. In the instance that a tire has been overinflated previously, the pressure valve can regulate the PSI by venting excessive pressure.

Figure 9:
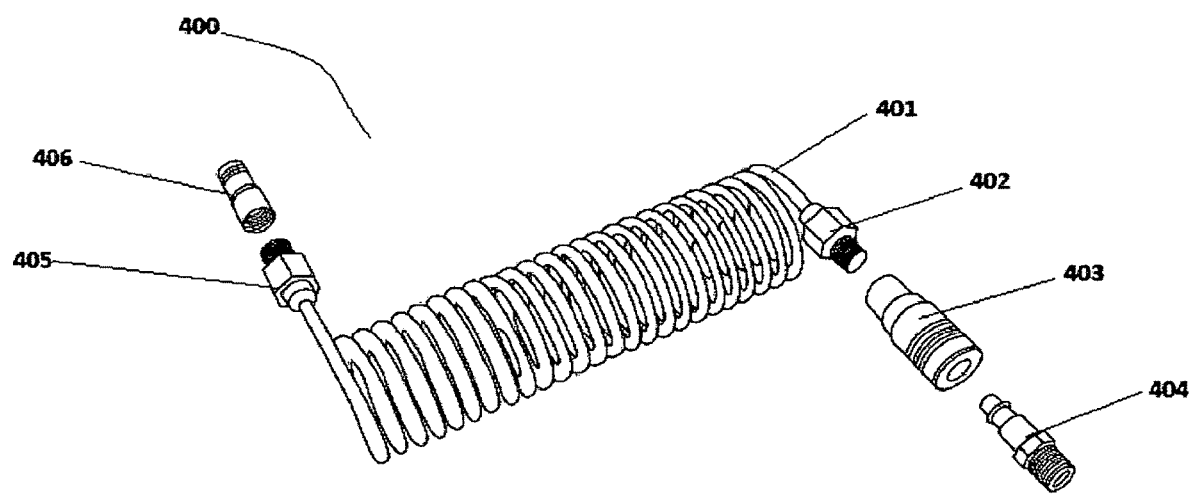
FIG. 9 is an additional illustration of the present invention, showing the hose assembly of tire inflating device of present invention.

In reference to FIGS. 8-9, the hose assembly 400 further comprises a self-coiling hose or other hose type 401, a plurality of fittings (402-405), and a tire valve stem chuck 406. One end of the hose assembly 400 connects to the control head 200, while the second end connects to the tire(s). Numerous fittings may be used in the present invention depending on type of tire(s) and application and as such the present invention is not limited to a specific model. The plurality of fittings further comprises a male coupler 404, and a female coupler 403 as referenced in FIG. 9. The plurality of couplers allows users to connect the present invention to various type of tire valve stems. The self-coiling hose or other hose 401 is extendable making the present invention easy to use and set up at various lengths.

According to one another aspect of the invention, a battery maintenance device can be incorporated into the invention that when secured to a vehicle's battery will monitor the battery and charge it only when the voltage has dropped below a preset level, thus preventing overcharging, dead and/or damage. When it senses the voltage has dropped, the battery tender will resume charging. Because of this the battery tender can be left connected indefinitely.

According to one another aspect of the invention, the invention can include a battery booster or jumper battery for starting a vehicle with a discharged or dead battery.

Although the invention has been explained in relation to its preferred embodiment, it is to be understood that many other possible modifications and variations can be made without departing from the spirit and scope of the invention.

I claim:

1. A tire inflating device to inflate, maintain, and monitor the condition of a vehicle tires is comprising of:
    a carrying case having a housing;
    a control head assembly configure within the housing; wherein the control head assembly is further comprising of:
        a program control module configured to control the operations of the tire inflating device and to allow programming of the tire inflating device;
        an auto level manifold configured to allow connection of all the tires of vehicle together in parallel to bring all of them at same pounds per square inch (PSI);
        a plurality of output modules configured within the auto level manifold to provide pressurized air for tire inflation; an air release valve configured to evenly decrease the tire air pressure by releasing undesired air pressure;
        a pressure release valve configured to prevent the tires from being overinflated;
        a plurality of buttons and switches configured to select the modes, adjust the PSI, and manipulate the operation of device etc.; and
        a display unit;
    an air compressor positioned at the bottom of the housing and directly connected with the control head assembly;
    a hose assembly configured to detachably connect the plurality of output modules of the control head assembly to the tires of the vehicle to inflate; and
    a plurality of power adapters configured to connect the tire inflating device with a power source;
    wherein the hose assembly further comprises a self-coiling hose, a plurality of fittings and a tire valve stem chuck;
    wherein the tire inflating device comprises different modes of operations including an auto level mode, an inflate mode, and a maintainer mode with an Auto ON PSI and an Auto OFF PSI modes;
    wherein the Auto ON PSI mode further includes a PSI mode, a Time PSI check mode, a Hold PSI, and a continuous mode.

2. The tire inflating device of claim 1, wherein the carrying case further comprises a lid attached to the housing using a hinge, a plurality of locking latches to lock the lid over the housing and a handle configured over the lid to allow easy transport of the tire inflating device.

3. The tire inflating device of claim 1, wherein the housing of the carrying case further comprises plurality of storage compartments designed to allow to keep the plurality of hose assembly and plurality of power adapters within the carrying case.

4. The tire inflating device of claim 1, wherein the power is received from either AC using a wall outlet or hardwire or DC using cigarette lighter plug, APO, clamps or clips onto battery or hard wire installation.

5. The tire inflating device of claim 1, further comprises an electrical breakage to protect against damage caused by overcurrent.

6. The tire inflating device of claim 1, wherein the Auto level mode automatically levels all the tires to the same PSI.

7. The tire inflating device of claim 1, wherein the Inflate mode automatically fills all tires evenly to preset PSI and then turns off automatically.

8. The tire inflating device of claim 1, wherein the inflate mode further allows inflation of different PSI's to each tire per the requirements of tire, vehicle, user specifications.

9. The tire inflating device of claim 1, wherein the Auto OFF mode turns the air compressor off once the tires reaches the desired PSI.

10. The tire inflating device of claim 1, wherein the Auto ON mode that automatically turns on when tire(s) deflates and turns off when tire PSI reaches to the preset Auto OFF PSI setting.

11. The tire inflating device of claim 1, wherein the PSI mode determines the PSI level the tires can reach before turning on the compressor; the Times PSI check mode that monitors the tire pressure after a preset interval of time only; and the Continuous mode that continuously monitors and turns on the compressor even if there is 1 PSI decrease in pressure.

\* \* \* \* \*